United States Patent [19]
Yarnell et al.

[11] Patent Number: 5,610,217
[45] Date of Patent: Mar. 11, 1997

[54] ETHYLENE-ALPHA-OLEFIN BELTING

[75] Inventors: Larry Yarnell, Morrison; Bobbie E. South, Littleton, both of Colo.

[73] Assignee: The Gates Corporation, Denver, Colo.

[21] Appl. No.: 549,892

[22] Filed: Oct. 30, 1995

Related U.S. Application Data

[63] Continuation-in-part of Ser. No. 331,825, Oct. 31, 1994.

[51] Int. Cl.$^6$ .............................. C08K 5/09; F16G 1/02; F16G 1/10
[52] U.S. Cl. .............. 524/397; 474/191; 474/264; 474/271; 524/426; 524/427; 524/494; 524/451; 524/495
[58] Field of Search ...................... 524/397; 474/271, 474/264, 191

[56] References Cited

U.S. PATENT DOCUMENTS

| | | | |
|---|---|---|---|
| 4,191,671 | 3/1980 | Kataoka et al. | 524/397 |
| 4,192,790 | 3/1980 | McKinstry et al. | 524/397 |
| 4,500,466 | 2/1985 | Hayes et al. . | |
| 4,713,409 | 12/1987 | Hayes et al. | 524/274 |
| 4,925,898 | 5/1990 | Itokazu et al. . | |
| 4,983,678 | 1/1991 | Seito et al. . | |
| 5,281,651 | 1/1994 | Arjunan et al. . | |
| 5,312,869 | 5/1994 | Nomura et al. . | |
| 5,408,007 | 4/1995 | Mizuno et al. . | |

FOREIGN PATENT DOCUMENTS

| | | |
|---|---|---|
| 0589701 | 3/1994 | European Pat. Off. . |
| 0590423 | 4/1994 | European Pat. Off. . |
| 4222760 | 1/1993 | Germany . |
| 4309893 | 9/1993 | Germany . |
| 55-45086 | 11/1980 | Japan . |
| 3-748 | 1/1991 | Japan . |
| 44-240 | 1/1992 | Japan . |
| 53-39426 | 12/1993 | Japan . |
| 63-46948 | 12/1994 | Japan . |
| 2273711 | 6/1994 | United Kingdom . |

OTHER PUBLICATIONS

WO–90/13599 (Exxon Chemical patents Inc.–USA) published Nov. 15, 1990.
WO–94/22947 published Oct. 13, 1994.

*Primary Examiner*—Veronica P. Hoke
*Attorney, Agent, or Firm*—C. H. Castleman; H. W. Oberg; S. G. Austin

[57] ABSTRACT

Elastomeric compositions for incorporation in articles subject to dynamic loading, comprising an ethylene-alpha-olefin elastomer which is reinforced with a filler and a metal salt of an α-β-unsaturated organic acid. This composition is cured using a free-radical promoting material. The invention includes articles subject to dynamic loading incorporating these elastomeric compositions, and belting, including power transmission and flat belting incorporating as their main belt body portions these elastomeric compositions.

21 Claims, 1 Drawing Sheet

ETHYLENE-ALPHA-OLEFIN BELTING

This is a continuation-in-part of pending U.S. patent application Ser. No. 08/331,825, which was filed on 31 Oct. 1994.

BACKGROUND OF THE INVENTION

1. Field of the Invention

The present invention relates to belting, including power transmission and flat belts and other shaped articles useful in dynamic applications, incorporating free-radical cured elastomer compositions comprising ethylene-alpha-olefin elastomers mixed with metal salts of $\alpha$-$\beta$-unsaturated organic acids and a reinforcing filler. More particularly, the invention relates to belting and other shaped articles useful in dynamic applications, incorporating such compositions as their primary elastomer which exhibit superior adhesion to textile reinforcement materials in the substantial absence of additional adhesion promoters in the base elastomer, and maintain excellent mechanical properties, including abrasion resistance, pilling resistance, tensile strength and modulus, under dynamic loading conditions.

2. Description of Prior Art

Ethylene-alpha-olefin elastomers, including ethylene-propylene copolymers (EPM) and ethylene-propylene-diene terpolymers (EPDM) are recognized as excellent general purpose elastomers, having broader operating temperature ranges than most other elastomers. EPM and EPDM have substantially saturated backbone chains which promote oxygen- and ozone resistance. These materials are generally less expensive than other elastomers, and tolerate high concentrations of filler and oil while maintaining good physical properties thus increasing their economy. For these reasons, ethylene-alpha-olefin elastomers have been widely used either alone or blended with other elastomers in applications including hose, seals, gaskets, roofing materials and weather stripping.

A known disadvantage of these materials however, is their inferior performance in dynamic applications. Because ethylene-alpha-olefin elastomers are known to exhibit only moderate fatigue resistance, abrasion resistance, tensile strength and modulus in dynamic applications, as well as inadequate adhesion to metal and textile reinforcement materials, they are not commonly used as the primary elastomer in applications characterized by dynamic loading, such as power transmission belting, flat belting, air springs, engine mounts and the like. The elastomeric materials most commonly used in this context are polychloroprene, styrene-butadiene rubber and natural rubber due to their favorable combination of mechanical properties and good processibility. What is meant by the term, "primary elastomer" in the present context is an elastomer which constitutes greater than 50% by weight of the elastomeric components of an elastomeric composition.

EPM and EPDM have been blended with other elastomers exhibiting more favorable mechanical properties for use in dynamic applications. These elastomers include polychloroprene, nitrile-diene rubbers and organopolysiloxane resins. In such cases, EPM or EPDM is added to improve the ozone- or oxygen resistance or reduce the cost of the final compositions. The amount of EPM or EPDM added however, is limited to less than about 40% by weight of the final elastomeric composition in order to maintain satisfactory mechanical properties. In addition, EPDM having a high concentration of ethylene, i.e., greater than about 80% by mole, has been suggested for use as the primary elastomer in products such as belting. This material however, is difficult to process on open mills and calenders due to its narrow molecular weight range and highly crystalline nature.

Several methods for improving the mechanical properties of elastomers are known. Increasing the amount of reinforcing filler or peroxide increases hardness and modulus of a cured elastomeric composition. Increasing the filler level, however, has the disadvantage of adversely affecting the flex life of the product by contributing to the elastomer's heat build-up. Increasing the peroxide level presents the possibility of improving modulus while reducing tear strength, flex fatigue resistance and elongation. The effect may be so severe as to embrittle the polymer.

Peroxide- or free-radical curing is commonly used in place of sulfur curing, for both saturated and unsaturated polymers to improve heat aging properties, decrease compression set and improve adhesion to treated and untreated textiles. It is also known that the incorporation of certain acrylate moieties as coagents for peroxide-curing of elastomeric compositions improves hot tear strength, and promotes abrasion resistance, oil resistance and adhesion to metals. Thus for example, metal salts of acrylic acids have been used as coagents in the peroxide curing of blends incorporating EPDM and other elastomers to improve overall performance. Acrylates as reinforcing fillers have also been used to minimize chain scission and to improve the efficiency of vulcanization.

An ethylene-alpha-olefin elastomeric composition possessing physical properties in dynamic environments sufficient to serve as the primary elastomeric composition in applications such as for example, in belting including power transmission and flat belting, air springs, engine mounts and the like, is highly desirable in order to decrease material costs, increase heat stability, and improve resistance to oxygen and ozone degradation of such articles.

SUMMARY OF THE INVENTION

To date, an ethylene-alpha-olefin elastomeric composition which is readily processed, and with adequate mechanical properties in dynamic applications and acceptable adhesion to textile reinforcement materials, to enable its use as the primary base elastomeric composition in applications such as belting including power transmission and flat belting, air springs, engine mounts and the like has not been known.

Accordingly, it is an object of the present invention to provide an elastomeric material for use as the primary elastomeric composition in articles subject to dynamic loading, comprising an ethylene-alpha-olefin elastomer composition capable of maintaining excellent abrasion resistance, pilling resistance, tensile strength, cut-growth resistance, modulus and adhesion to reinforcement materials under high and low temperature dynamic loading conditions.

It is another object of the present invention to provide improved belting comprising as its main belt body portion an ethylene-alpha-olefin elastomer exhibiting improved mechanical properties and excellent adhesion to textile reinforcement materials.

To achieve the foregoing and other objects and in accordance with a purpose of the present invention as embodied and broadly described herein, a fatigue resistant, abrasion resistant, high tensile strength, high modulus elastomer composition is provided having sufficient physical properties in dynamic applications elastomeric component of an article subject to dynamic loading. This elastomeric material is cured using a free radical promoting material, and comprises the reaction product of 100 parts by weight of an a ethylene-alpha-olefin elastomer which serves as the primary elastomer of the composition, from about 1 to about 30 parts per hundred weight of the elastomer (phr) of a metal salt of an $\alpha$-$\beta$-unsaturated organic acid, and from about 25 to about 250 phr of a reinforcing filler.

In another aspect of the present invention, an article subject to dynamic loading and incorporating as its primary elastomeric component the elastomeric composition described above, is provided.

In yet another aspect of the present invention, improved belting incorporating as its main belt body portion a flex fatigue resistant, abrasion resistant, high tensile strength, high modulus elastomeric composition is disclosed. The main belt body portion is prepared from an ethylene-alpha-olefin elastomer which has been cured with a free-radical promoting material. A tensile member is disposed within the body portion, and a sheave contact portion is integral with the main belt body portion. The elastomeric composition is formed by mixing and milling together in accordance with conventional rubber processing practice a resin mixture comprising, by weight, 100 parts of an ethylene-alpha-olefin elastomer which serves as the primary elastomer of the composition, from about 1 to about 30 phr of a metal salt of an $\alpha$-$\beta$-unsaturated organic acid, and from about 25 to about 250 phr of a reinforcing filler. This elastomeric material when cured exhibits excellent adhesion to the belt's tensile member in the substantial absence of additional adhesion promoters.

The ethylene-alpha-olefin elastomeric compositions useful in the present invention may optionally contain other conventional additives which are commonly utilized in elastomer compositions. Such additives may include process and extender oils, antioxidants, waxes, pigments, plasticizers, softeners and the like. These additives may be employed in amounts conventionally used in standard rubber compounds.

An advantage is realized when a multi-V-ribbed belt of the present invention is exposed to low angular frequencies and high angular acceleration. The invention has the beneficial result of substantially inhibiting pilling of the lateral surfaces at low frequencies. Consequently, belt performance is improved in such applications. It has been surprisingly found that such pilling resistance is enhanced when the ethylene content of the ethylene-alpha-olefin elastomer is maintained within a specified range as set forth below.

Other advantages or objects of the invention will be apparent after reviewing the drawings and descriptions of the preferred embodiments. Although the invention is adaptable to dynamic application uses in general, three power transmission belts are shown in detail for illustration purposes.

BRIEF DESCRIPTION OF THE DRAWINGS

The accompanying drawings which are incorporated in and form a part of the specification illustrate preferred embodiments of the invention, and together with a description, serve to explain the principles of the invention. In the drawings.

DESCRIPTION OF THE PREFERRED EMBODIMENTS

Figure 1:
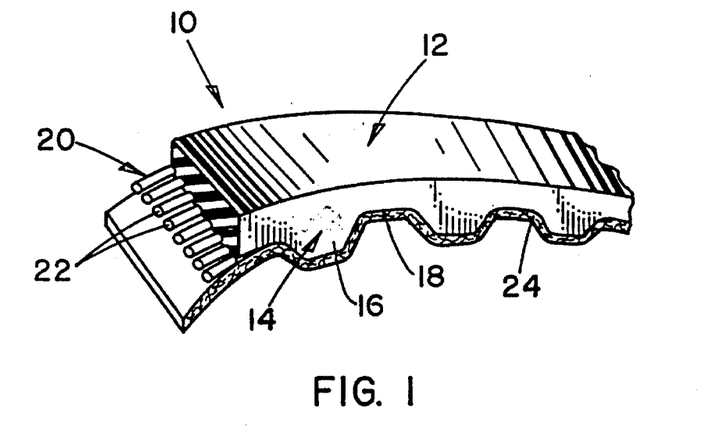
FIG. 1 is a perspective view, with parts in section, of a synchronous belt constructed in accordance with the present invention.

Referring to FIG. 1, a typical synchronous belt 10 is illustrated. The belt 10 includes an elastomeric main belt body portion 12 and a sheave contact portion 14 positioned along the inner periphery of the main belt body portion 12. The word, "sheave" in this context includes normal pulleys and sprockets used with power transmission belts, and also pulleys, rollers and like mechanisms used with conveyor and flat belting. One example of a sheave and belt system is illustrated in U.S. Pat. No. 4,956,036, the contents of which are hereby incorporated by reference. The particular sheave contact portion 14 of FIG. 1 is in the form of alternating teeth 16 and land portions 18. A tensile layer 20 is positioned within the main belt body portion 12 for providing support and strength to the belt 10. In the illustrated form, the tensile layer 20 is in the form of a plurality of strain-resisting cords 22 aligned longitudinally along the length of the main belt body portion 12. It should be understood, however, that any type of tensile layer 20 known to the art may be utilized. Moreover, any desired material may be used as the tensile member, such as cotton, rayon, nylon, polyester, aramid, steel and even discontinuous fibers oriented for load carrying capability. In the preferred embodiment of FIG. 1, the tensile layer 20 is in the form of the illustrated cords 22 made from aramid fiber available under the trademark Kevlar. Other preferred cords include fiberglass and carbon filament for power transmission belts as in FIG. 1, and polyester cords for V-belts as in FIG. 2, below.

A reinforcing fabric 24 may be utilized and intimately fits along the alternating teeth 16 and land portions 18 of the belt 10 to form a face cover therefor. This fabric may be of any desired configuration such as a conventional weave consisting of warp and weft threads at any desired angle or may consist of warp threads held together by spaced pick cords, or of a knitted or braided configuration, and the like. The fabric may be friction- or skim-coated with the same or different elastomer composition of the body 12. More than one ply of fabric may be employed. If desired, the fabric 24 may be cut on a bias so that the strands form an angle with the direction of travel of the belt. Conventional fabrics may be employed using such materials as cotton, polyester, polyamide, hemp, jute, fiberglass and various other natural and synthetic fibers. In a preferred embodiment of the invention, the fabric layer 24 consists of an expansible wear-resistant fabric in which at least one of the warp or weft threads is made of nylon. In the most preferred form, the fabric layer 24 is made of nylon 66 stretch fabric.

Figure 2:
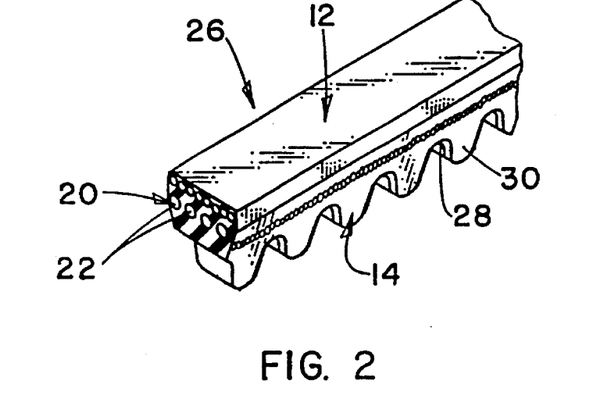
FIG. 2 is a perspective view, with parts in section, of a V-belt constructed in accordance with the present invention.

Referring to FIG. 2, a standard notched V-belt 26 is illustrated. The V-belt 26 includes main elastomeric belt body portion 12 similar to that illustrated in FIG. 1 and a tensile reinforcement member 20 in the form of cords 22, also similar to those illustrated in FIG. 1. The main elastomeric belt body portion 12 and the cords 22 of the V-belt 26 are constructed from the same materials as described above for FIG. 1.

The V-belt 26 also includes a sheave contact portion 14 as in the synchronous belt of FIG. 1. The side surfaces of the sheave contact portion 14 serve as the driving surfaces of the V-belt 26. In this embodiment the sheave contact portion 14 is in the form of alternating notch depression surfaces or troughs 28 and toothed projections 30. These alternating notched depression surfaces 28 and tooth projections 30 preferably follow a generally sinusoidal path as illustrated which serves to distribute and minimize bending stresses as the sheave contact portion 14 passes around pulleys and sheaves.

Figure 3:
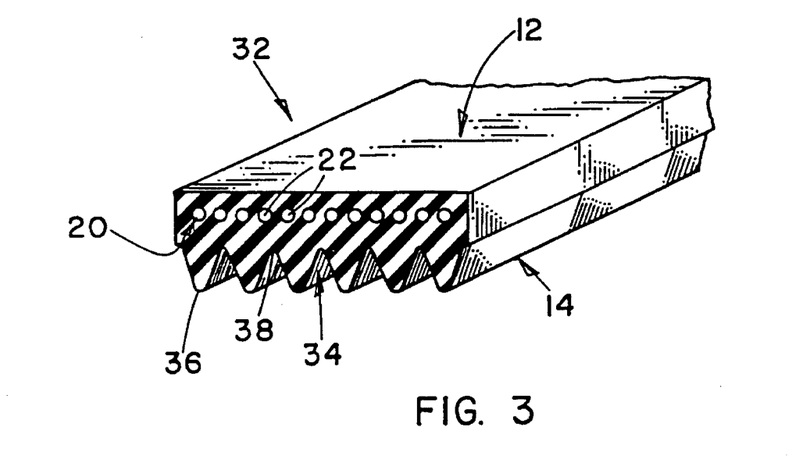
FIG. 3 is a perspective view, with parts in section, of a multi-V-ribbed belt constructed in accordance with the present invention.

Referring to FIG. 3, a multi-V-ribbed belt 32 is illustrated. The multi-V-ribbed belt 32 includes a main elastomeric belt body portion 12 as in the belts of FIGS. 1 and 2 and also includes a tensile reinforcement member 20 preferably in the form of cords 22, also as previously described. A plurality of raised areas or apexes 36 alternating with a plurality of trough areas 38 define therebetween oppositely facing sides 38 which serve as the sheave driving surfaces 14 of the belt 32. In each of these instances of FIGS. 1–3, the sheave contact portion 14 is integral with the main belt body portion 12 and formed from the same elastomeric material to be described in greater detail below.

In the most preferred embodiment the belting, as described in FIGS. 1–3, incorporate as its main belt body portion the elastomeric composition described below which has been loaded with discontinuous fibers comprising conventional staple fiber or pulp fiber reinforcement materials. Examples of fiber having suitable tensile modulus and wear resistant qualities are aramid fibers, such as those sold under the trademark KEVLAR by E. I. du Pont de Nemours & Company; the trademark TECHNORA as sold by Teijin of Japan; and the trademark TWARON as sold by Enka of Holland. Staple fibers range in length from less than 0.25 mm to about 12 mm, preferably from about 0.5 mm to about 7 mm, most preferably from about 1 mm to about 3 mm. The elastomeric body portion is loaded with fiber at a concentration of preferably from about 0.5 to about 20 percent by volume, and more preferably from about 1 to about 6 percent by volume. Most preferably, the fiber loading is at a concentration of about 2.1 percent by volume of the body portion. In the preferred embodiment, the fibers are oriented in a direction running perpendicular to the travel of the belt, such that the fiber protrudes from about 0.1 mm to about 0.3 mm from the elastomeric body.

While the present invention is illustrated with reference to the embodiments shown in FIGS. 1–3, it should be understood that the present invention is not to be limited to these particular embodiments or forms as illustrated but rather is applicable to any dynamic application construction within the scope of the claims as defined below.

The elastomeric composition useful in the present invention comprises an ethylene-alpha-olefin elastomeric composition which exhibits improved fatigue resistance as reflected in flex-fatigue analysis results, improved abrasion resistance, pilling resistance, tensile strength and modulus, as well as improved adhesion to the tensile member in the substantial absence of additional adhesion promoters in the base elastomer. The ethylene-alpha-olefin elastomeric composition is formed by mixing and milling together in accordance with conventional rubber processing practice a resin mixture comprising, by weight, 100 parts of an ethylene-alpha-olefin elastomer, from about 1 to about 30 phr of a metal salt of an α-β-unsaturated organic acid, and from about 25 to about 250 phr of a reinforcing filler such as carbon black or hydrated silica. The elastomer composition is cured with an organic peroxide or other free-radical promoting material, optionally in the presence of a minor amount of sulfur in a mixed cure system.

The ethylene-alpha-olefin elastomers useful in the present invention include but are not limited to copolymers composed of ethylene and propylene units (EPM), ethylene and butene units, ethylene and pentene units, or ethylene and octene units (EOM), and terpolymers composed of ethylene and propylene units and an unsaturated component (EPDM), as well as mixtures thereof. As the unsaturated component of EPDM, any appropriate non-conjugated diene may be used, including for example, 1,4-hexadiene, dicyclopentadiene or ethylidenenorbornene (ENB). The ethylene-alpha-olefin elastomer preferred in the present invention contains from about 35% by weight to about 80% by weight of the ethylene unit, from about 65% by weight to about 25% by weight of the propylene or octene unit, and 0–10% by weight of the unsaturated component. In a more preferred embodiment, the ethylene-alpha-olefin elastomer contains from about 55% to about 78% by weight of the ethylene unit, and in a most preferred embodiment, the ethylene-alpha-olefin elastomer contains from about 65% to about 75% of the ethylene unit. At these more preferred ethylene unit content levels, endless belts incorporating as their main belt body portions the ethylene-alpha-olefin elastomic compositions of this preferred embodiment of the present invention exhibit improved pilling resistance. The most preferred ethylene-alpha-olefin elastomer is EPDM.

To form the elastomer composition of the present invention the ethylene-alpha-olefin elastomer may optionally be blended with less than 50% by weight, more preferably up to about 25%, and most preferably from about 5% to about 10% based on the total elastomeric content of the composition of a second elastomeric material including but not limited to silicone rubber, polychloroprene, epichlorohydrin, hydrogenated nitrile butadiene rubber, natural rubber, ethylene-vinyl-acetate copolymer, ethylene methacrylate copolymers and terpolymers, styrene butadiene rubber, nitrile rubber, chlorinated polyethylene, chlorosulfonated polyethylene, alkylated chlorosulfonated polyethylene, transpolyoctenamer, polyacrylic rubbers, butadiene rubber, and mixtures thereof, to fine-tune certain mechanical properties such as high temperature performance and tack.

The incorporation of metal salts of α-β-unsaturated organic acids in the elastomeric compositions of the present invention is critical. It is thought that the excellent properties of the ethylene-alpha-olefin elastomeric compositions useful in the present invention are due to the ionic crosslinking of these metal salts with peroxide. The ionic bonds are believed to break and reform along the elastomeric back-bone chain under stress, similar to the action of polysulfide crosslinks in sulfur-cured systems, contributing tensile strength and tear strength to the elastomer. This mechanism may also lead to the improved pilling resistance exhibited by the elastomeric composition. These ionic bonds are thought to accomplish this formation-release-reformation activity preferentially to breaking carbon-carbon bonds. Unlike the polysulfide bonds or the free radicals formed in breaking carbon-carbon bonds in sulfur-cured systems, these ionic bonds are not affected by exposure to oxygen and are thus not as prone to form sticky residues under abrasive conditions. This oxygen tolerance is also believed to make the ionic crosslinks much more stable to heat and oxidation than conventional sulfur-cured elastomers.

The metal salts of α-β-unsaturated organic acids useful in the present invention are metal salts of acids such .as for example, acrylic, methacrylic, maleic, fumaric, ethacrylic, vinyl-acrylic, itaconic, methyl itaconic, aconitic, methyl aconitic, crotonic, alpha-methylcrotonic, cinnamic, and 2,4-dihydroxy cinnamic acids. These salts may be of zinc, cadmium, calcium, magnesium, sodium or aluminum, and are preferably those of zinc. The preferred metal salts of α-β-unsaturated organic acids are zinc diacrylate and zinc dimethacrylate. The most preferred metal salt of unsaturated organic acid is zinc dimethacrylate. Amounts of the metal salt useful in the present invention may range from about 1 to about 30 phr, and are preferably from about 5 to about 20 phr. In the most preferred embodiment, the metal salt is zinc dimethacrylate used in an amount of about 5 phr when used in conjunction with EPDM mixed with up to about 10% of silicone rubber, and from about 10 to about 20 phr and more preferably about 15 phr when used in conjunction with the other ethylene-alpha-olefin elastomers useful in the present invention.

The ethylene-alpha-olefin elastomeric compositions useful in the endless belts of the present invention further comprise from about 25 to about 250 phr and preferably from about 25 to about 100 phr of a reinforcing filler such as carbon black, calcium carbonate, talc, clay or hydrated silica, or mixtures of the foregoing. The incorporation of from 1 to 30 phr of a metal salt of an unsaturated organic acid and from about 25 to about 250 phr and preferably about 25 to about 100 phr of reinforcing filler in the peroxide-cured ethylene-alpha-olefin elastomeric composition preserves the heat stability of conventional peroxide-cured elastomers, while providing the tear strength and dynamic properties usually associated with sulfur cured elastomers.

The free-radical producing curatives useful in the present invention are those suitable for curing ethylene-alpha-olefin elastomers and include for example, organic peroxides and ionizing radiation. The preferred curative is an organic peroxide, including but not limited to dicumyl peroxide, bis-(t-butyl peroxy-diisopropyl benzene, t-butyl perbenzoate, di-t-butyl peroxide, 2,5-dimethyl-2,5-di-t-butylperoxyhexane, α-α-bis(t-butylperoxy) diisopropylbenzene. The preferred organic peroxide curative is α-α-bis(t-butylperoxy) diisopropylbenzene. Cure-effective amounts of organic peroxide for purposes of the present invention are typically from about 2 to about 10 phr. Preferred levels of organic peroxide are from about 4 to about 6 phr. Sulfur may optionally be added to the organic peroxide curative as part of a mixed cure system in an amount of from about 0.01 to about 1.0 phr, to improve the cured elastomer's Young's modulus without negatively affecting its tear resistance.

Other conventional ethylene-alpha-olefin elastomer additives, process and extender oils, antioxidants, waxes, pigments, plasticizers, softeners and the like may be added according to common rubber processing practice without departing from the present invention. For example, in a preferred embodiment of the present invention, the elastomeric composition also contains from about 0.5 to about 1.5 phr of an antiozonant or antioxidant and from about 5 to about 15 phr of a paraffinic petroleum oil plasticizer/softener.

The ethylene-alpha-olefin elastomeric compositions useful in the present invention may be prepared by any conventional procedure such as for example, by mixing the ingredients in an internal mixer or on a mill.

The following examples are submitted for the purpose of further illustrating the nature of the present invention and are not intended as a limitation on the scope thereof. Parts and percentages referred to in the examples and throughout the specification are by weight unless otherwise indicated.

Examples 1, 3 and 5 and Comparative Examples 2, 4 and 6

Table 1 illustrates the elastomeric composition formulations for test samples for Examples 1, 3, 5 and 7 of the present invention, and for Comparative Examples 2, 4, 6 and 8. Table 2 illustrates analytical data of unaged samples for Examples 1, 3, 5 and 7 and Comparative Examples 2, 4, 6 and 8. Table 3 illustrates analytical data of aged samples for Examples 1, 3, 5 and 7 and Comparative Examples 2, 4, 6 and 8. Tables 4 and 5 illustrate adhesion analysis data for aged and unaged samples, respectively, of Examples 1, 3, and 5 and of Comparative Examples 2, 4, and 6. Table 6 illustrates comparison data of multi-V-ribbed belts made in accordance with the invention and the description provided for FIG. 3 above, with the addition that they are fiber-loaded, and a conventional multi-V-ribbed belt incorporating fiber-loaded polychloroprene as its main belt body portion and sheave contact portion.

In these examples and comparative examples, elastomer processing was carried out in the following manner. Processing for Examples 1 and 3 and Comparative Examples 2 and 4 was carried out in a 1A Banbury mixer having an inner volume of 16,500 cubic centimeters; kneading was carried out at approximately 30 rpm. Processing for Examples 5 and 7 and Comparative Examples 6 and 8 was carried out in a BR Banbury mixer having an inner volume of 1,570 cubic centimeters; kneading was carried out at approximately 77 rpm. The batches were processed as three-pass mixes. In the first pass, all ingredients except the organic peroxide were added to the Banbury and mixed to a temperature of about 154° C. or to a maximum time of 10 minutes. In the second pass the batch was remilled to about 154° C. and then dropped. In the third pass, the organic peroxide was first added, then the batch was remilled to a temperature of 88° C. and dropped.

Physical tests were conducted for all molded compounds after molding and again after heat aging at 125° C. for 168 hours, unless otherwise specified. Properties of the vulcanized products were measured according to the following test protocols: Pico abrasion resistance by ASTM D228-8; tensile properties by ASTM D412-87 with the modification that the rate of grip separation was 6-inches per minute to accommodate the fiber loading of the belts; tensile properties of aged samples by ASTM D573-88; tear strength by ASTM D624-91; hardness by ASTM D2240-91; crack growth by the Demattia method ASTM D813-87; Tabor method for pilling ISO-5470-1980.

In the following formulations:

| Trade Name | Composition, Supplier |
| --- | --- |
| Nordel 1070 | Ethylene propylene diene terpolymer (EPDM), by E. I. DuPont de Nemours |
| Royaltherm 1411 | Silicone-modified EPDM, by Uniroyal |
| Engage CL 8001 | Ethylene octane copolymer (EOM), by Dow Chemical |
| Vistalon 606 | Ethylene propylene copolymer (EPM), by Exxon Chemical |

-continued

| Trade Name | Composition, Supplier |
|---|---|
| Hi-Sil 233 | Precipitated hydrated amorphous silica, by Pittsburgh Plate Glass Co. Americas |
| N330 | Carbon Black, I#82, by Huber Co. |
| N550 | Carbon Black, I#43, by Huber Co. |
| Sunpar 2280 | Paraffinic oil, ASTM D2226 type 104B, by Sun Refining Co. |
| Agerite Resin D | Polymerized 1,2-dihydro-2,2,4-trimethylquinoline, by B. F. Goodrich Co. |
| Saret 634 | Zinc dimethacrylate by The Sartomer Co. |
| Vul-Cup 40KE | α-α-bis(t-butylperoxy) diisopropylbenzene on Burgess KE clay, by Hercules Inc. |

TABLE 1

| | Example 1 | Comparative Example 2 | Example 3 | Comparative Example 4 | Example 5 | Comparative Example 6 | Example 7 | Comparative Example 8 |
|---|---|---|---|---|---|---|---|---|
| Nordel 1070 | 100 | 100 | 0 | 0 | 0 | 0 | 0 | 0 |
| Royaltherm 1411 | 0 | 0 | 100 | 100 | 0 | 0 | 0 | 0 |
| Engage CL 8001 | 0 | 0 | 0 | 0 | 100 | 100 | 0 | 0 |
| Vistalon 606 | 0 | 0 | 0 | 0 | 0 | 0 | 100 | 100 |
| Hi-Sil 233 | 0 | 0 | 40 | 40 | 0 | 0 | 0 | 0 |
| N330 | 0 | 0 | 0 | 0 | 50 | 50 | 0 | 0 |
| N550 | 60 | 60 | 0 | 0 | 0 | 0 | 55 | 55 |
| Sunpar 2280 oil | 10 | 10 | 0 | 0 | 10 | 10 | 10 | 10 |
| Agerite Resin D | 1 | 1 | 1 | 1 | 1 | 1 | 1 | 1 |
| Saret 634 | 15 | 0 | 5 | 0 | 15 | 0 | 15 | 0 |
| Vul-Cup 40KE | 5 | 5 | 6 | 6 | 5 | 5 | 5 | 5 |

TABLE 2

Analysis of Ungaged Samples

| | Example 1 | Comparative Example 2 | Example 3 | Comparative Example 4 | Example 5 | Comparative Example 6 | Example 7 | Comparative Example 8 |
|---|---|---|---|---|---|---|---|---|
| Durometer UA | 63.8 | 56.8 | 81 | 70 | 82.5 | 77.8 | 65.7 | 58.2 |
| % Eb | 378.1 | 364.1 | 361.8 | 416.2 | 444.8 | 445.8 | 390.3 | 488.7 |
| M100 (psi) | 550.6 | 337.9 | 852.2 | 535.6 | 812.4 | 602.2 | 525 | 270 |
| Tensile at Break (psi) | 3130 | 2443 | 2682 | 2835 | 4678 | 4372 | 2915 | 2160 |
| "C" Tear (lbs./inch) | 274 | 227 | 280 | 242 | 396 | 355 | 271 | 223 |
| Pico Abrasion Index | 142 | 94 | 157 | 91 | 265 | 223 | 129 | 109 |
| Tabor Abrader Volume Loss (mm³) | 94.5 | 16.9 | 172.6 | 131.6 | — | — | 111.2 | 20.8 |
| Demattia 0.5" at 100° C. (inches/magacycle) | 5.8 | 22.1 | 15.4 | 42.6 | 0.8 | 0.7 | 0.3 | 0.3 |
| Demattia 2.25" Room Temp. (inches/megacycle) | 34.8 | 74.1 | 397 | 308 | 12.2 | 4.3 | 21.4 | 5.3 |

A peculiar problem associated with multi-V-ribbed belts is that of pilling build-up between adjacent ribs, wherein "pills" or abraded material accumulate along the ribs and are retained on the belt. For this reason, weight loss results are not always completely accurate reflections of the pilling phenomenon. Thus in Table 2, while the lower Tabor abrader values for volume loss for the Comparative samples seem to indicate greater abrasion resistance than their counterparts incorporating zinc dimethacrylate, these artificially inflated values are due to abraded material or "pills" actually building up but not being removed from the Comparative test samples during analysis. This build-up is indicative of the material's tacky nature and probably also indicates a tendency toward pilling in the actual application. This pilling effect was notably absent in the examples containing zinc dimethacrylate. Thus, the lower Tabor abrader values for the Comparative Examples indicate a decrease in abrasion resistance relative to their counterparts incorporating zinc dimethacrylate according to this invention.

addition of zinc dimethacrylate, ethylene-alpha-olefin samples generally exhibited increased modulus while maintaining acceptable flex fatigue properties.

Referring to Tables 4 and 5, adhesion effectiveness was determined by tensile analysis of cured elastomeric specimens according to standard "t"-peel test methods. The test was run at a crosshead rate of 5.1 centimeters per minute and stock tear percentages at both room temperature and 125° C. were measured. Polyester fabric sheets, measuring approximately 2.5 centimeters wide, were adhered to elastomer

TABLE 3

| Analysis of Aged Samples | | | | | | | | |
|---|---|---|---|---|---|---|---|---|
| | Example 1 | Comparative Example 2 | Example 3 | Comparative Example 4 | Example 5* | Comparative Example 6* | Example 7 | Comparative Example 8 |
| Durometer | 69.1 | 62.4 | 86 | 75 | 67.6 | 61.7 | 70.2 | 58.2 |
| % Eb | 345.5 | 395.2 | 248.2 | 344.5 | 410 | 477 | 376 | 552 |
| M100 (psi) | 645.6 | 331.8 | 1228 | 681 | 857.5 | 614.6 | 548.2 | 244.9 |
| Tensile at Break (psi) | 3096 | 2497 | 2795 | 3031 | 4531 | 4157 | 3019 | 2173 |
| "C" Tear (lbs./inch) | 273.8 | 217.1 | 304.3 | 263.8 | 384.8 | 329.4 | 282.3 | 219.9 |
| Demattia 2.25" Aged 125° C. 168 hours (inches/ megacycle) | 30.6 | 59.6 | — | — | 7** | 3** | 25.3 | 2.3 |

1*Example 5 and Comparative Example 6 samples heat aged at 150° C. for 168 hours.
**Demattia 2.25" analysis for Example 5 and Comparative Example 6 samples performed after heat aging at 175° C. for 70 hours.

Overall, the results of Tables 2 and 3 indicate that the addition of zinc dimethacrylate to the ethylene-alpha-olefin elastomeric compositions results in compositions displaying dramatic improvements in modulus and increased pilling resistance, while maintaining acceptable elongation, hardness and flex fatigue resistance tensile strength at break and abrasion resistance. Notably, as reported in DeMattia analysis results of both unaged and aged samples, with the samples prepared according to the formulations for Examples 1, 3 and 5 and for Comparative Examples 2, 4 and 6. The elastomer samples measured approximately 0.127 centimeters in thickness. The polyester fabric sheets were adhered to the elastomer samples by means of a first coat of a solvent based isocyanate primer and a second coat of vinyl pyridine/styrene butadiene rubber resorcinol formaldehyde latex.

TABLE 4

| Adhesion Analysis of Unaged Samples | | | | |
|---|---|---|---|---|
| | lbs./in. pull at room temperature (kg/cm) | % stock tear, room temperature | lbs./in. pull at 125° C. (kg/cm) | % stock tear, 125° C. |
| Example 1 | 50 (43) | 100 | 16 (14) | 100 |
| Comparative Example 2 | 23 (20) | 0 | 19 (16) | 100 |
| Example 3 | 22 (19) | 50 | 8 (7) | 75 |
| Comparative Example 4 | 13 (11) | 0 | 3 (3) | 0 |
| Example 5 | 97 (84) | 80 | 38 (33) | 100 |
| Comparative Example 6 | 8 (7) | 0 | 29 (25) | 5 |

TABLE 5

Adhesion Analysis of Samples Aged One Week at 150° C.

|  | lbs./in. pull at room temperature (kg/cm) | % stock tear, room temperature | lbs./in. pull at 125° C. (kg/cm) | % stock tear, 125° C. |
| --- | --- | --- | --- | --- |
| Example 1 | 43 (37) | 100 | 14 (12) | 100 |
| Comparative Example 2 | 62 (54) | 100 | 22 (19) | 100 |
| Example 3 | 11 (10) | 5 | 4 (4) | 40 |
| Comparative Example 4 | 8 (7) | 0 | 2 (2) | 0 |
| Example 5 | 93 (81) | 100 | 43 (37) | 100 |
| Comparative Example 6 | 95 (82) | 40 | 43 (37) | 0 |

In Tables 4 and 5, zero stock tear indicates failure at the rubber-adhesive interface. Notably, while exhibiting no stock tear or cohesive failure at room temperature, unaged samples of Comparative Examples 2, 4 and 6 all exhibited adhesive failure under those conditions. Unaged samples of Examples 1, 3 and 5 however, exhibited cohesive failure at room temperature under an applied force much greater than their comparative counterparts, indicating significantly improved adhesive properties. Both Example 1 and Comparative Example 2 which were based on EPDM under the brand name Nordel 1070 available from E. I. DuPont de Nemours, exhibited stock tear under elevated temperatures. Examples 3 and 5 for both aged and unaged samples exhibited stock tear whereas their comparative counterparts did not, thus demonstrating more robust adhesion where zinc dimethacrylate was used. Most notably, samples containing zinc dimethacrylate exhibited good adhesive properties in both aged and unaged states, while the samples without zinc dimethacrylate exhibited poor adhesive characteristics in the unaged state.

For the flex-fatigue, wear resistance and load capacity analysis results shown in Table 6, belts made in accordance with embodiments of the present invention (Belt 1, Belt 2, Belt 3) were compared to standard, commercially available belts (Comparative Belt A). Belt 1 was a multi-V-ribbed belt made in accordance with the description for FIG. 3, wherein the main belt body portion and sheave contact portion were made with EPDM mixed with zinc dimethacrylate in accordance with the formulation for Example 1 above, with the modification that N330 carbon black was used in place of N550 carbon black, and the body portion was fiber loaded. Belt 2 was a multi-V-ribbed belt similar to Belt 1 in all respects except that for Belt 2, Vistalon 606 was used in place of Nordel 1070, and the formulation included 55 phr of N330 Carbon Black. Belt 3 was a multi-V-ribbed belt similar to Belt 1 in all respects except that for Belt 3, Engage CL 8001 was used in place of Nordel 1070. In addition, Belt 3 contained 0.50 phr of a substituted diphenylamine antioxidant available from Uniroyal Chemical under the trade name, Naugard 445, as well as a zinc-2-mercaptotolylimidozole antioxidant available from R. T. Vanderbilt under the trade name, Vanox ZMTI. The peroxide curative for Belt 3 was used in an amount of 5.50 phr. Comparative Belt A was a standard polychloroprene ("CR"), fiber loaded multi-V-ribbed belt. Tensile means for Belt 1, Belt 2, and Belt 3 were provided by polyester terephthalate cord. The cord was adhered to the elastomer portions of the belts by means of a cord treatment, comprising an isocyanate primer followed by a vinyl pyridine styrene butadiene rubber latex, or a vinyl pyridine carboxylated styrene butadiene rubber latex, and a cord dip comprising the polymeric adhesive known by the trade name Chemlok 238, available from The Lord Corporation. Additionally, 3 mm staple fibers of aramid treated with a resorcinol formaldehyde latex, available from Teijin of Japan under the trade name TECHNORA, comprised the fiber-loading material for Belt 1, Belt 2 and Belt 3, and the same material comprised the fiber-loading of Comparative Belt A, except that 1 mm aramid fibers were used for Comparative Belt A. The belts measured about 112 centimeters long and 1.067 centimeters in width.

To determine load carrying capability at high tension, the multi-V-ribbed belts were trained around two multi-grooved pulleys, each measuring 6.1 centimeters in diameter. The belts were operated at 3500 rpm and 7.1 horsepower at a constant tension of 264 lbs./in. (229 kg/cm) at room temperature. For the load capacity data in Table 6, the belts were operated to a point of failure, as evidenced by edge cord separation, separation of ribs, or more catastrophic belt failure.

For the wear resistance and flex-fatigue analysis, the belts were subjected to four-point water brake tests wherein the belts were trained around two multi-grooved major pulleys, an inside tensioning idler and a backside idler. The two major pulleys measured 12.1 centimeters in diameter; the inside tensioning idler measured 4.4 centimeters in diameter and the backside idler measured 7.6 centimeters in diameter. The belts were operated at 4900 rpm and 11 horsepower at a constant tension of 110 lbs./in. (95 kg/cm). For the wear resistance test, the belts were first weighed, then trained around the sheaves and operated at room temperature for 96 hours, and reweighed to determine weight loss. For the first flex-fatigue analysis, the belts were trained around the pulleys and idlers and operated at 4900 rpm at 100° C. until failure, as evidenced by the formation of a number of cracks equal to one more than the number of belt ribs. For the second flex-fatigue analysis, the belts were similarly trained around the pulleys and idlers and operated at 4900 rpm at 110° C. until failure, as evidenced by the formation of a number of cracks equal to one more than the number of belt ribs.

TABLE 6

|  | Belt Analysis | | | |
| --- | --- | --- | --- | --- |
|  | Belt 1 (EPDM) | Belt 2 (EPM) | Belt 3 (EOM) | Comparative Belt A 2 (CR) |
| Load Capacity (hours) | 232 | 341 | 677 | 58 |
| Weight Loss (gms) | 0.59 | 0.57 | 0.57 | 0.68 |

TABLE 6-continued

| | Belt Analysis | | | |
|---|---|---|---|---|
| | Belt 1 (EPDM) | Belt 2 (EPM) | Belt 3 (EOM) | Comparative Belt A 2 (CR) |
| Flex-Fatigue 100° C. (hours) | 1356 | 1040 | — | 120 |
| Flex-Fatigue 110° C. (hours) | — | 732 | 947 | — |

Notably, Belt 1 exhibited a four-fold increase in load capacity over the polychloroprene belt while exceeding its wear resistance properties. Moreover, Belt 1, incorporating as its main belt body portion, a fiber-loaded EPDM elastomer mixed with zinc dimethacrylate, displayed a ten-fold increase in belt life compared to the standard polychloroprene belt, as measured by flex-fatigue analysis. Belt 2, based on Vistalon 606 mixed with zinc dimethacrylate exhibited greater than a five-fold increase in load capacity over the standard polychloroprene belt and dramatically improved belt life as measured by flex-fatigue analysis at both 100° C. and 110° C. Belt 3, based on Engage CL 8001 mixed with zinc dimethacrylate similarly exhibited dramatic increases in load capacity over the standard polychloroprene-based belt, as well as demostrating outstanding flex fatigue resistance.

The improvement in dynamic properties of the belting of the present invention, including power transmission and flat belting, is attributable to the incorporation as its main belt body portion or sheave contact portion, of a peroxide-cured elastomeric composition comprising as its primary elastomer an ethylene-alpha-olefin elastomer, which is mixed with a metal salt of an $\alpha$-$\beta$-unsaturated organic acid. The resultant elastomeric composition displays superior adhesion to textile reinforcement materials in the substantial absence of additional adhesion promoters in the base elastomer. Notwithstanding the elastomeric composition's superior adhesion to textile reinforcement materials in the substantial absence of additional adhesion promoters in the base elastomer, such adhesion promoters, including methylene and resorcinol donors in H-R-H dry rubber adhesion systems may be used in the construction of belting without departing from the present invention.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. An article subject to dynamic loading selected from the group consisting of power transmission belting, flat belting, air sleeves and engine mounts incorporating as its primary elastomeric composition a composition cured using a free-radical promoting material, and comprising the reaction product of:

(a) 100 parts by weight of an ethylene-alpha-olefin elastomer, which serves as the primary elastomer of said composition;

(b) from about 1 to about 20 parts per hundred weight of said elastomer of a metal salt of an alpha-beta-unsaturated organic acid; and, (c) from about 25 to about 250 parts per hundred weight of said elastomer of a reinforcing filler;

said elastomeric composition exhibiting sufficient modulus, hardness and flex fatigue resistance to serve as the primary elastomeric component of said article.

2. A belt, adapted to engage a sheave, comprising a main belt body portion exhibiting high flex fatigue resistance, high abrasion resistance, high tensile strength, high pilling resistance, good adhesion to textile members and high modulus, said main belt body portion being prepared from an elastomeric composition cured with a free-radical promoting material; tensile means disposed in said body portion; and a sheave contact portion integral with said body portion, said elastomeric composition comprising:

(a) 100 parts by weight of an ethylene-alpha-olefin elastomer, which serves as the primary elastomer of said composition;

(b) from about 1 to about 30 parts per hundred weight of said elastomer of a metal salt of an alpha-beta-unsaturated organic acid; and, (c) from about 25 to about 250 parts per hundred weight of said elastomer of a reinforcing filler.

3. The belt of claim 2, wherein said sheave contact portion is prepared from said elastomeric composition.

4. The belt of claim 2, wherein said ethylene-alpha-olefin elastomer is selected from the group consisting of:

(a) ethylene propylene copolymers;

(b) ethylene octene copolymers;

(c) ethylene propylene diene terpolymers; and (d) mixtures thereof.

5. The belt of claim 3 wherein the ethylene-alpha-olefin elastomer is blended with up to 25 percent by weight based on the weight of the ethylene-alpha-olefin elastomer of a second elastomeric material selected from the group consisting of:

a) silicone rubber, b) polychloroprene, c) epichlorohydrin, d) hydrogenated nitrile butadiene rubber, e) natural rubber, f) ethylene-vinyl-acetate copolymer, g) ethylene methacrylate copolymers and terpolymers, h) styrene butadiene rubber, i) nitrile rubber, j) chlorinated polyethylene, k) chlorosulfonated polyethylene, l) alkylated chlorosulfonated polyethylene, m) trans-polyoctenamer, n) polyacrylic rubber, o) butadiene rubber, and p) mixtures of the foregoing.

6. The belt of claim 2 wherein the elastomeric composition is substantially free of supplemental adhesion promoters yet exhibits good adhesion to said tensile means.

7. The belt of claim 2, wherein said ethylene-alpha-olefin elastomer is ethylene propylene diene terpolymer.

8. The belt of claim 2, wherein said metal salt of an $\alpha$-$\beta$-unsaturated organic acid comprises metal salts of acids chosen from the group consisting of acrylic, methacrylic, maleic, fumaric, ethacrylic, vinyl-acrylic, itaconic, methyl itaconic, aconitic, methyl aconitic, crotonic, alpha-methyl-crotonic, cinnamic, and 2,4-dihydroxy cinnamic acids.

9. The belt of claim 8, wherein said metal salts acids are chosen from the group consisting of:

(a) zinc salts;

(b) cadmium salts;

(c) calcium salts;

(d) magnesium salts;

(e) sodium salts; and, (f) aluminum salts.

10. The belt of claim 2, wherein said metal salt is selected from the group consisting of:

(a) zinc diacrylate; and, (b) zinc dimethacrylate.

11. The belt of claim 2 wherein said metal salt is zinc dimethacrylate.

12. The belt of claim 2, wherein said curative is a cure-effective amount of a material selected from the group consisting of;

(a) organic peroxides, (b) said organic peroxides blended with from about 0.01 to about 1.0 parts per hundred weight of said elastomer of sulfur, and, (c) ionizing radiation.

13. The belt of claim 2, wherein said elastomeric composition comprises said reinforcing filler in an amount of from about 25 to about 100 parts per hundred weight of said elastomer.

14. The belt of claim 2, wherein said belt is in the form of a power transmission belt selected from the group consisting of synchronous belts, V-belts and multi-V-ribbed belts.

15. The belt of claim 2 wherein said ethylene-alpha-olefin elastomer is characterized by a specific ethylene unit content, said ethylene unit content being from about 55% to about 78% by weight of said elastomer.

16. The belt of claim 2 wherein said ethylene-alpha-olefin elastomer is characterized by a specific ethylene unit content, said ethylene unit content being from about 65% to about 75% by weight of said elastomer.

17. A belt, adapted to engage a sheave, comprising a main belt body portion exhibiting high flex fatigue resistance, high abrasion resistance, high tensile strength, high pilling resistance, good adhesion to textile members and high modulus, said main belt body portion being prepared from an elastomeric composition; tensile means disposed in said body portion; and a sheave contact portion integral with said body portion, said elastomeric composition comprising;

(a) 100 parts by weight of an ethylene propylene diene terpolymer, which serves as the primary elastomer of said composition;

(b) from about 1 to about 20 parts per hundred weight of said ethylene propylene diene terpolymer of zinc dimethacrylate;

(c) from about 4 to about 6 parts per hundred weight of said ethylene propylene diene terpolymer of alpha-alpha-bis(t-butylperoxy) diisopropylbenzene; and (d) from about 25 to about 100 parts per hundred weight of said ethylene propylene diene terpolymer of a carbon black reinforcing filler.

18. The belt of claim 17, wherein said belt is in the form of a power transmission belt selected from the group consisting of synchronous belts, V-belts and multi-V-ribbed belts.

19. A belt drive system comprising the belt of claim 17 trained about at least one driver sheave and at least one driven sheave.

20. The belt of claim 2 or claim 17 in the form of a multi-V-ribbed belt, wherein said main belt body portion is fiber loaded.

21. The belt of claim 3 wherein the elastomeric composition comprises from about 1 to about 20 parts per hundred weight of said elastomer of a metal salt of an alpha-beta-unsaturated organic acid.

* * * * *

UNITED STATES PATENT AND TRADEMARK OFFICE
CERTIFICATE OF CORRECTION

PATENT NO. : 5,610,217          Page 1 of 2

DATED : March 11, 1997

INVENTOR(S) : Larry Yarnell and Bobbie E. South

It is certified that error appears in the above-identified patent and that said Letters Patent is hereby corrected as shown below:

In column 12, Table 4, data row 1, data column 1, that portion reading "(43)" should read, --(9)--
In column 12, Table 4, data row 2, data column 1, that portion reading "(20)" should read, --(4)--
In column 12, Table 4, data row 3, data column 1, that portion reading "(19)" should read, --(4)--
In column 12, Table 4, data row 4, data column 1, that portion reading "(11)" should read, --(2)--
In column 12, Table 4, data row 5, data column 1, that portion reading "(84)" should read, --(17)--
In column 12, Table 4, data row 6, data column 1, that portion reading "(7)" should read, --(1)--
In column 12, Table 4, data row 1, data column 3, that portion reading "(14)" should read -- (3)--
In column 12, Table 4, data row 2, data column 3, that portion reading "(16)" should read, --(3)--
In column 12, Table 4, data row 3, data column 3, that portion reading "(7)" should read, --(1)--
In column 12, Table 4, data row 4, data column 3, that portion reading "(3)" should read, --(0.5)--
In column 12, Table 4, data row 5, data column 3, that portion reading "(33)" should read, --(7)--
In column 12, Table 4, data row 6, data column 3, that portion reading "(25)" should read, --(5)--
In column 13, Table 5, data row 1, data column 1, that portion reading "(37)" should read, --(8)--
In column 13, Table 5, data row 2, data column 1, that portion reading "(54)" should read, --(11)--
In column 13, Table 5, data row 3, data column 1, that portion reading "(10)" should read, --(2)--
In column 13, Table 5, data row 4, data column 1, that portion reading "(7)" should read, --(1)--

UNITED STATES PATENT AND TRADEMARK OFFICE
CERTIFICATE OF CORRECTION

PATENT NO. : 5,610,217
DATED : March 11, 1997
INVENTOR(S) : Larry Yarnell and Bobbie E. South It is certified that error appears in the above-identified patent and that said Letters Patent is hereby corrected as shown below:

In column 13, Table 5, data row 5, data column 1, that portion reading "(81)" should read, --(17)--
In column 13, Table 5, data row 6, data column 1, that portion reading "(82)" should read, --(17)--
In column 13, Table 5, data row 1, data column 3, that portion reading "(12)" should read, --(3)--
In column 13, Table 5, data row 2, data column 3, that portion reading "(19)" should read, --(4)--
In column 13, Table 5, data row 3, data column 3, that portion reading "(4)" should read, --(1)--
In column 13, Table 5, data row 4, data column 3, that portion reading "(2)" should read, --(0.4)--
In column 13, Table 5, data row 5, data column 3, that portion reading "(37)" should read, --(8)--
In column 13, Table 5, data row 6, data column 3, that portion reading "(37)" should read, --(8)--
In column 14, line 31, that portion reading "a constant tension of 264 lbs./in. (229 kg/cm)", should read, --a constant tension of 264 pounds (1174 N)--

In column 14, line 44, that portion reading "a constant tension of 110 lbs./in. (95 kg/cm)", should read, --a constant tension of 110 pounds (489 N)--

Signed and Sealed this

Tenth Day of March, 1998

*Attest:*

*Attesting Officer*

BRUCE LEHMAN

*Commissioner of Patents and Trademarks*